United States Patent
Morkel et al.

(10) Patent No.: US 9,648,040 B1
(45) Date of Patent: May 9, 2017

(54) AUTHORIZATION CHECK USING A WEB SERVICE REQUEST

(71) Applicant: Amazon Technologies, Inc., Reno, NV (US)

(72) Inventors: John Michael Morkel, Cape Town (ZA); Derek Avery Lyon, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 608 days.

(21) Appl. No.: 14/031,869

(22) Filed: Sep. 19, 2013

(51) Int. Cl.
*H04L 29/06* (2006.01)

(52) U.S. Cl.
CPC .......... *H04L 63/20* (2013.01); *H04L 63/0227* (2013.01); *H04L 63/10* (2013.01)

(58) Field of Classification Search
CPC ...... H04L 63/20; H04L 63/0227; H04L 63/10
See application file for complete search history.

(56) References Cited

U.S. PATENT DOCUMENTS

| | | | | |
|---|---|---|---|---|
| 9,043,327 | B1 * | 5/2015 | Dunagan | G06Q 10/10 707/737 |
| 9,294,507 | B1 * | 3/2016 | Roth | H04L 63/20 |
| 9,325,739 | B1 * | 4/2016 | Roth | H04L 63/20 |
| 2006/0230430 | A1 * | 10/2006 | Hondo | H04L 63/102 726/1 |
| 2007/0156842 | A1 * | 7/2007 | Vermeulen | G06F 17/30212 709/217 |
| 2008/0168567 | A1 * | 7/2008 | Hahn | G06F 21/6236 726/28 |
| 2010/0125612 | A1 * | 5/2010 | Amradkar | H04L 63/105 707/802 |
| 2010/0235741 | A1 * | 9/2010 | Newman | G06F 9/542 715/716 |
| 2010/0250712 | A1 * | 9/2010 | Ellison | H04L 41/0233 709/219 |
| 2011/0113484 | A1 * | 5/2011 | Zeuthen | G06F 21/6281 726/19 |
| 2011/0258692 | A1 * | 10/2011 | Morrison | G06F 21/53 726/11 |
| 2013/0060933 | A1 * | 3/2013 | Tung | G06F 11/3495 709/224 |

(Continued)

OTHER PUBLICATIONS

Multitenancy Support Technical—Documentation Support—Juniper Networks, Sep. 16, 2013, pp. 1-3.*

(Continued)

*Primary Examiner* — Michael Pyzocha
(74) *Attorney, Agent, or Firm* — Klarquist Sparkman, LLP

(57) ABSTRACT

An authorization check web service request is disclosed. The web service request can include a parameter controlling whether or not to perform the action associated with the web service request. The parameter can be included in the web service request itself, or it can be separated therefrom, such as being included in a customer account. Using this parameter, the requestor can perform an authorization check without actually performing the action. Thus, customers can determine the authorization result of a request without actually processing the request itself. Customers and other services can use this parameter to determine their effective permissions.

17 Claims, 9 Drawing Sheets

(56) References Cited

U.S. PATENT DOCUMENTS

| | | | | |
|---|---|---|---|---|
| 2013/0072160 A1* | 3/2013 | Lawson | ................ | H04L 63/102 |
| | | | | 455/411 |
| 2013/0191527 A1* | 7/2013 | Ashok | ................... | G06F 9/5072 |
| | | | | 709/224 |
| 2013/0247226 A1* | 9/2013 | Sebes | ...................... | H04L 63/10 |
| | | | | 726/29 |
| 2013/0304929 A1* | 11/2013 | Fahlgren | ............. | H04L 65/1006 |
| | | | | 709/227 |
| 2014/0181130 A1* | 6/2014 | Davis | ................ | G06F 17/30557 |
| | | | | 707/758 |

OTHER PUBLICATIONS

Ganeti remote API—Ganeti v2.2.1 documentation, Nov. 15, 2010, pp. 1-21.*

* cited by examiner

AUTHORIZATION CHECK USING A WEB SERVICE REQUEST

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Access to cloud-based resources can require authentication and authorization. Authentication is based on user credentials and is the process of verifying that the user is whom they say they are. For example, a user typically can be authenticated through a user identification and secret or a cryptographically verifiable signature generated from a claim based on the request and a secret.

Authorization is the process of verifying that the user is permitted to do what they are trying to do. Thus, authorization is the function of specifying access rights to resources, which is related to information security and computer security. More particularly, "to authorize" is to define access policy, which can be access control rules in a computer system. During operation, the system uses the access control rules to decide whether access requests from (authenticated) consumers shall be approved (granted) or disapproved (rejected). Access control in computer systems and networks relies on access policies. The access control process can be divided into two phases: 1) policy definition phase where access is authorized, and 2) policy enforcement phase where access requests are approved or disapproved.

Currently, users can have difficulty knowing what actions they are authorized to carry out, without actually performing the action and verifying that it was successful.

DETAILED DESCRIPTION

Web services are commonly used in cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 1:
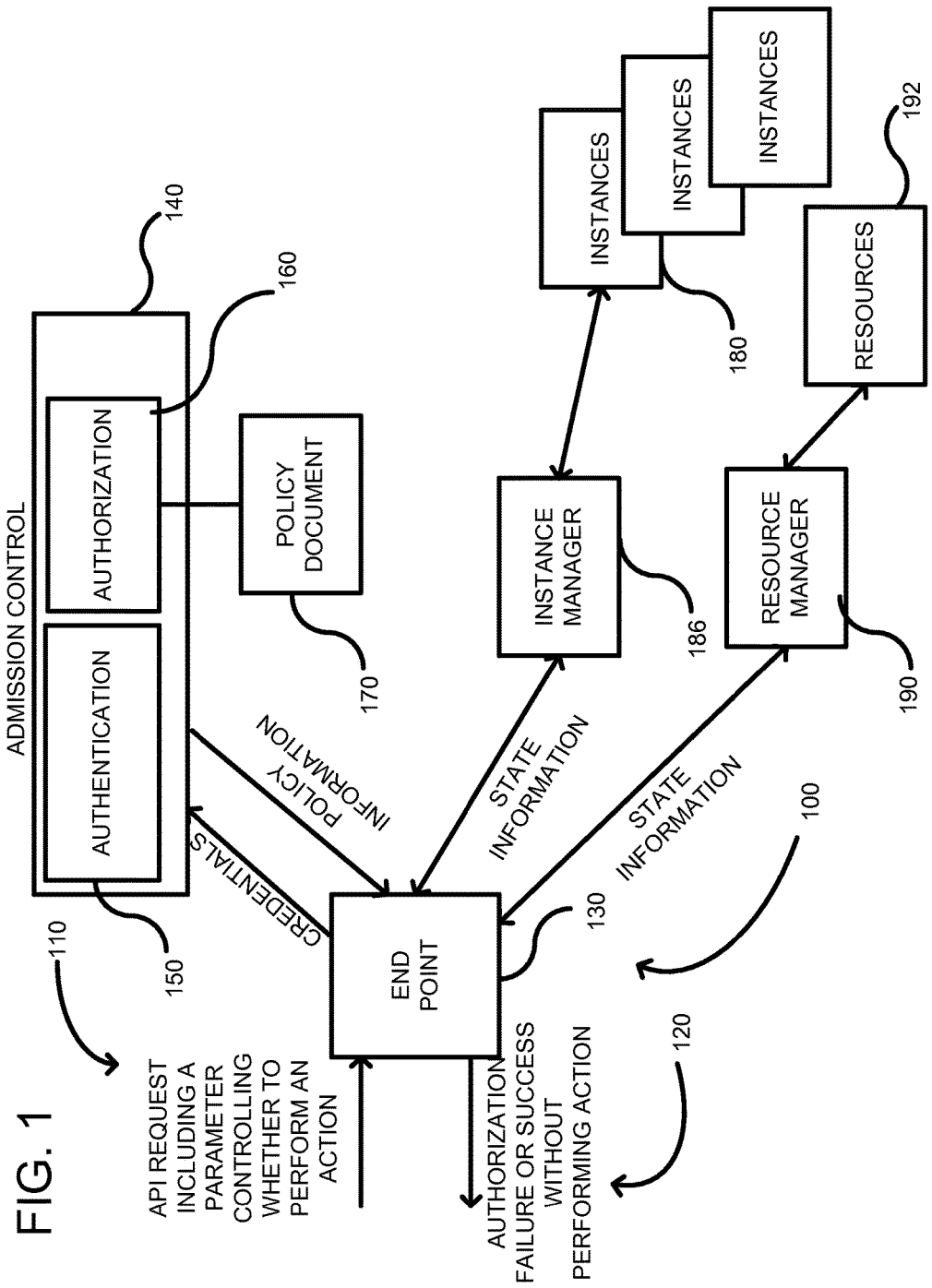
FIG. 1 is an embodiment of a system wherein an authorization check is made by an end point.

FIG. 1 shows a system 100 in which an authorization check API request (shown at 110) is made to perform an action. The API request 110 can include credentials of the requestor, such as a user identification and a password, and a parameter controlling whether or not to perform the action associated with the API. The parameter can be included in the API request itself, or it can be separated therefrom, such as being included in a customer account, which can be retrieved using the user identification. Using this parameter, the requestor can perform an authorization check without actually performing the action, as indicated in a response shown at 120. Thus, customers can determine the authorization result of an API request without actually processing the API request itself. Customers and other services can use this parameter to determine their effective permissions. A number of different permissions can depend on the current state of the resources that they act upon, as well as the policies that are currently in effect. As a result, the currently effective policy and the current state of the resources involved can be gathered in order to perform an authorization check for the API call in question. The result can then be returned to the customers or service making the request. In some particular implementations, the result returned to customers can potentially include a snapshot of the evaluation context, including both the policies and the resource context that was used to arrive at the authorization determination. The parameter can be used in a variety of contexts, such as for debugging policies or as a basis for more adaptive services, such as dynamically graying out a button in a console for a particular customer because the customer lacks permissions to perform the resulting action if he/she did press the button.

The API request 110 can be received by an end point 130, which can be a web server identified by a DNS address designed to receive and process API requests. The end point 130 can include software to evaluate the parameter and take appropriate action based on the parameter setting. Regardless of the parameter setting, the end point 130 can pass the requestor credentials to an admission control 140, which can authenticate the requestor using the credentials. One technique of authenticating can include comparing a user identification and password to one stored and accessible by an authentication component 150 within the admission control 140. Another is verifying a user-generated signature based on the details of the request and a secret key. The admission control 140 can also include an authorization component 160, which can determine permissions that the requestor has available through accessing a policy document 170. Once the permissions are obtained, they can be passed back to the endpoint in the form of policy information. The endpoint 130 can further retrieve state information from instances 180 that are executing on host server computers in the system 100. Typically, the end point 130 can access the state information through an instance manager 186, as further described below. State information can also be retrieved from one or more other resource managers 190, which communicate with resources 192. It should be understood that instance manager 186 can subsumed within the resource manager 190, but is shown separately merely for illustration. Once the end point 130 has retrieved the state information and the policy information, it can determine whether the requestor is authorized to perform the action associated with the API request. By determining whether the requestor is authorized, the end point can compare the state information to the policy information to determine whether the action will conform to the policy if it is carried out.

In some embodiments, the state information can be metadata associated with the instances. For example, the metadata can describe an instance type, what location (e.g., region) the instance is executing, what tags are associated with the instance, the security group with which the instance is associated, etc. Such state information is then compared to the policy. For example, the policy can say that instances in a region A cannot be terminated. An API request to terminate an instance in region A would fail after gathering state information indicating that the instances are executing in region A. In such a case, the response 120 can indicate an authorization failure. However, if the API request is authenticated and authorized (i.e., it is in conformance with the policy), then the end point 130 can check the parameter within the API request to determine whether to further process the API to carry out the action or simply return a response indicating an authorization success, but without carrying out the action. Carrying out the action can be performed by passing the API request to the necessary service to handle the request, according to established principles. By not carrying out the action, the end point 130 simply provides the response 120 without passing the request onto a service to handle the request.

The requestor (not shown) making the API request 110 can be a user, a web service, or an administrator. In the event of an administrator, the administrator can perform audits to determine a user's permissions. The administrator may or may not need the user's credentials. In the case where the administrator does not have the user's credentials, other aspects of the user's permission set can be passed so that the administrator appears in the role of the user being audited. Such auditing can occur on a periodic basis.

Figure 2:
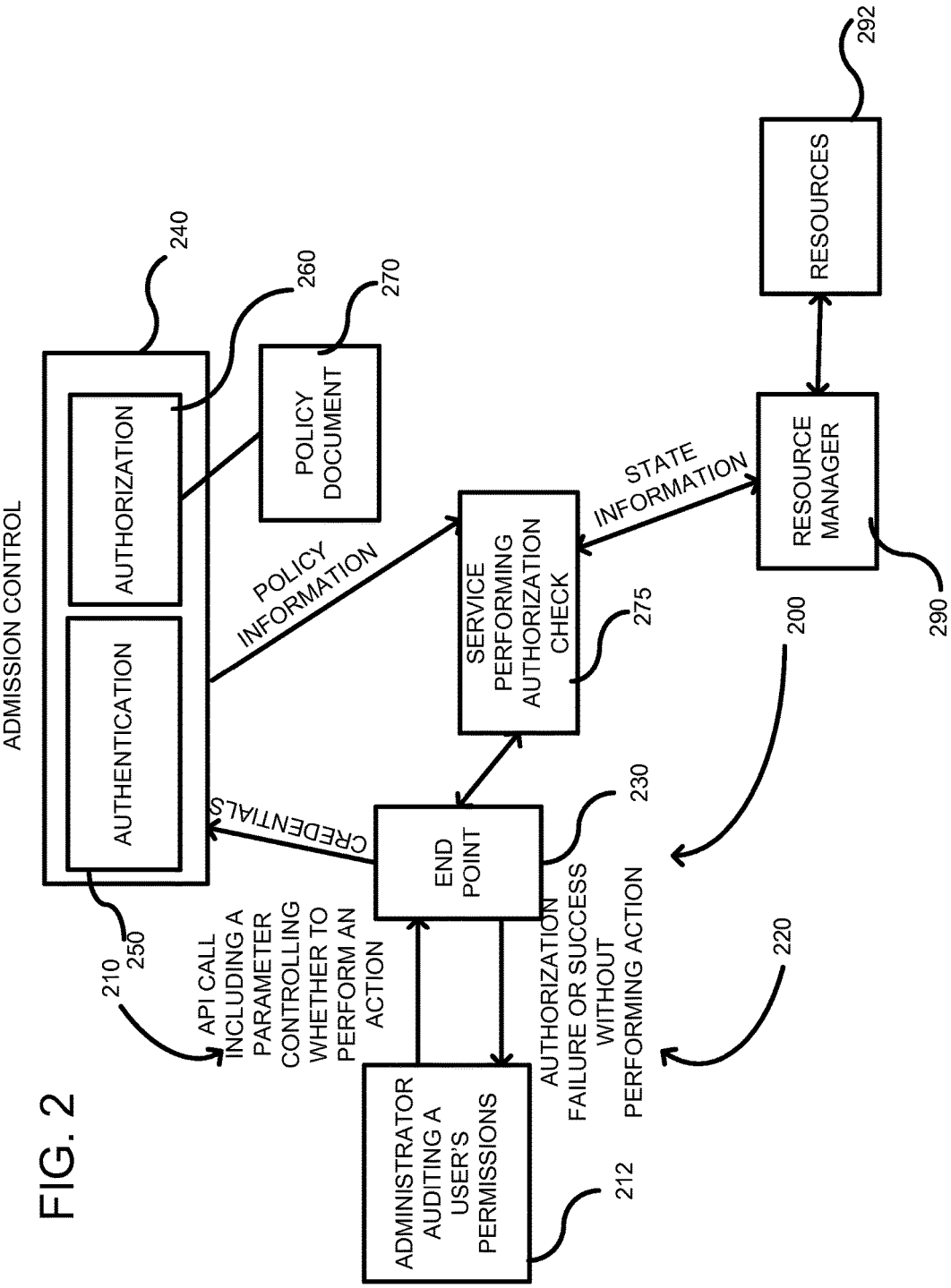
FIG. 2 is another embodiment of a system wherein an authorization check is made by a service separate from the end point.

FIG. 2 is an example of another embodiment of a system 200 in which an authorization check API request (shown at 210) is made. The system structure 200 can be used with a variety of sources making the API request including customers, administrators, other services, etc. However, for purposes of illustration, the system 200 is shown with an administrator 212 auditing a user's permissions by making the API request on a periodic basis. The administrator can also make non-periodic requests, such as for purposes of debugging to check a user's permissions. The API request 210 can include the full user's credentials or a portion thereof, so as to protect aspects of the user's credentials (i.e., the password). The API request can also include the parameter controlling whether or not to perform the action associated with the API, as described in relation to FIG. 1. Like the embodiment of FIG. 1, the parameter can be included in the API request itself, or it can be separated therefrom, such as being included in a customer account, which can be retrieved using the user identification. Using this parameter, the administrator can perform an authorization check without actually performing the action, as indicated in a response shown at 220.

The API request can be received by an end point 230, which can pass the credentials to an admission control 240. The admission control can have an authentication component 250 and an authorization component 260, similar to FIG. 1. The authorization component 260 uses the credentials passed by the administrator to identify the user's policy document, shown at 270. The authorization component 260 can gather the policy document 270 and pass policy information to a service 275 that is separate from the end point 230. In this case, the service can be a web service that performs an authorization check by receiving the API request and the policy information and making a request for state information from one or more resource managers 290, which request state information from resources 292.

The service 275 can therefore perform the authorization check and report the same to the end point so that the end point 230 can return the result 220 to the administrator. Thus, the service performing the authorization check need not be within the end point and can be separated therefrom. Alternatively, the authorization check service can be part of another service, such as the admission control. Regardless of its location, the authorization check service can receive policy information associated with a user and state information from the instances so as to make an assessment whether or not the requestor is authorized to perform the action associated with the API. If the user is authorized and the parameter is set, the end point 230 or the service 275 does not transmit the API request for further processing. Rather, a simple response 220 is sent to the requestor without performing the action.

Figure 3:
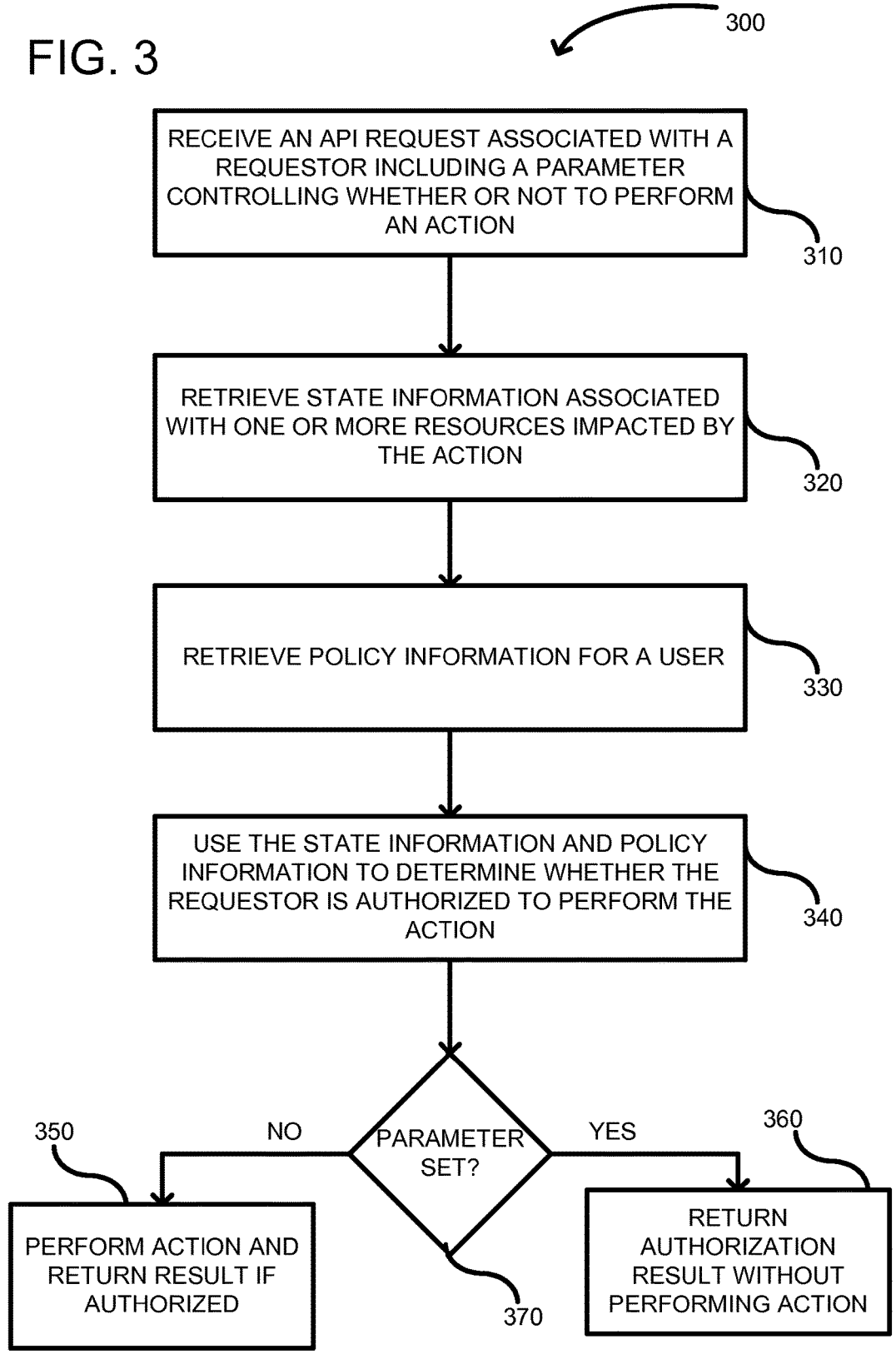
FIG. 3 is a detailed flowchart of an embodiment for performing the authorization check using any of the system embodiments.

FIG. 3 is a flowchart 300 for performing an authorization check of an API request for any of the embodiments shown herein, such as FIGS. 1 and 2. In process block 310, an API request is received associated with a requestor. The API call can be from a user itself or from an administrator auditing the user, for example. The API request can include a parameter that controls whether or not to perform an action. The parameter can be a simple Boolean operator having set and unset states, or it can be a more sophisticated parameter including additional information. In any event, the parameter can indicate that the API request is merely a check to determine whether there is authorization to carry out the action associated with the API request. In process block 320, state information can be retrieved associated with one or more resources impacted by the action. The resources are typically instances executing on host computers, but the resources can be other components, such as routers, switches, network components, volumes, etc. The resources can further be associated with information about users, such as an IP address from which the user is making a request, what groups with which the user is a member, the type of user, etc. The state information can be metadata associated with the resource in its current state. The metadata can be anything, such as what type of instance is executing, a region in which the instance is running, when the instance was launched, security groups associated with the instance, tags (which can define purpose, owner, environment, costs, deployment, user-supplied information, etc.) associated with the instance. Moreover, the metadata can dynamically change based on the state of the resource. In process block 330, policy information associated with the requestor can be retrieved. The policy information can describe what actions are permissible by the user associated with the credentials. The policy information can be retrieved using credentials (or a portion thereof) of the user. In some embodiments, the policy information can be associated with an anonymous user that need not have credentials. Whether an action is permissible can depend on the dynamic state information obtained from the resources themselves. The policy information can include permissions associated with the requestor or actions that are allowed to be performed on the resources. Thus, the policy information can be of the form of a plurality of policy permission statements, such as if-then statements: if (state information=variable) then action is not permissible or if (state information=variable) then action is permissible. In another simple example, a user can tag an instance as a master, and then modify the policy such that master instances cannot be terminated. In this way, user tags that are dynamically attached to instances after launch can also modify permissible actions. In process block 340, the state information and policy information can be used to determine whether the requestor is authorized to perform the action. For example, to ascertain whether certain policies are violated or complied with, metadata associated with the resources can be compared to the policy to determine if the requestor is authorized.

In decision block 370, a check is made whether the parameter is set or unset. In a set state, an authorization result is returned without performing the action (process block 360). For example, the end point can reply to the API request without further processing the API request. If the parameter is unset, then in process block 350, the action is performed if the API request is authorized. Performance of the action can require processing the API request by transmitting it to a service that can carry out the desired action. For example, an API request to terminate an instance can be passed to an instance manager, such as is shown at 186 in FIG. 1, that has built-in procedures for terminating instances.

Figure 4:
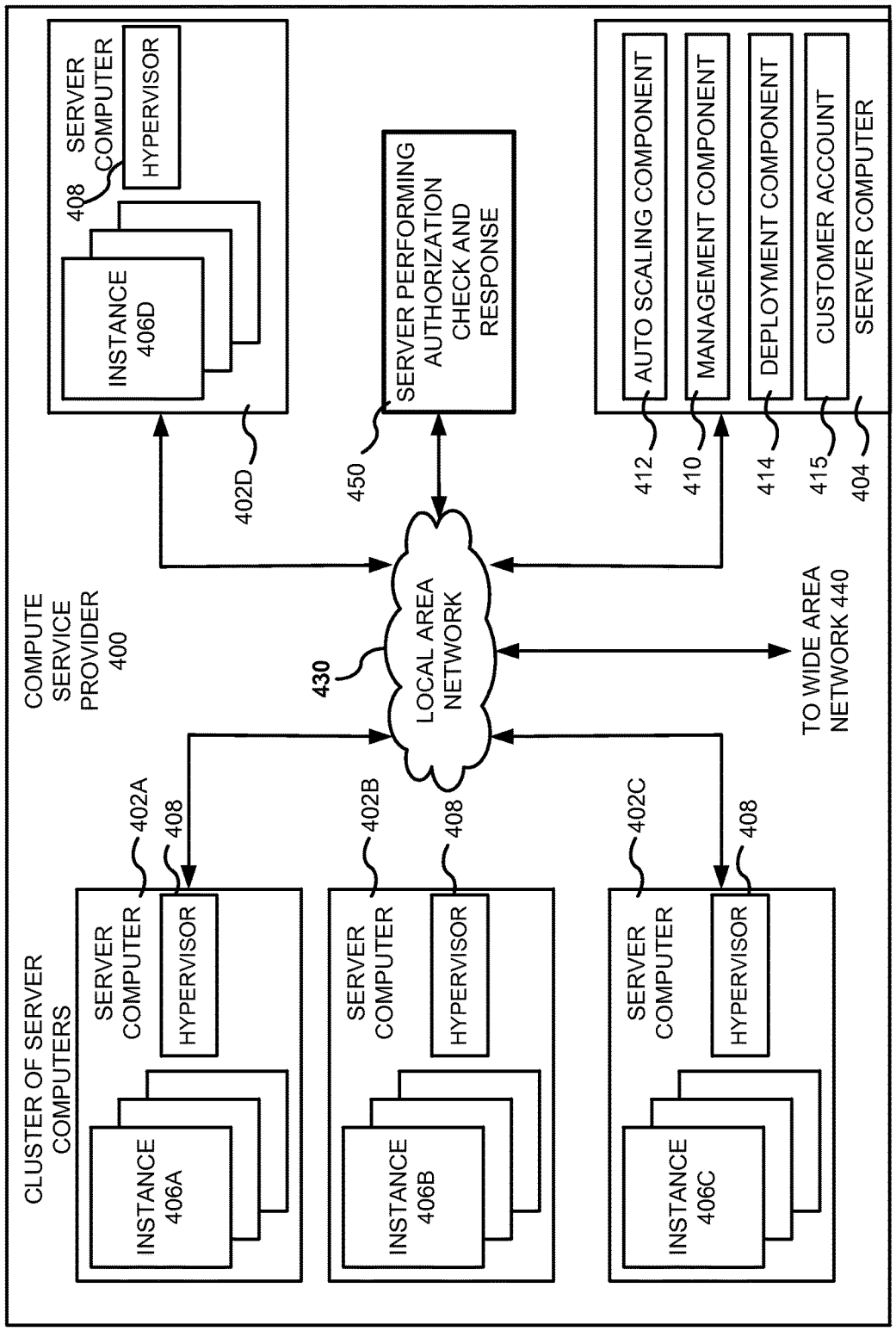
FIG. 4 is yet another embodiment of a system showing a plurality of virtual machine instances running in the multi-tenant environment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies, such as the policy documents 170, 270 shown in FIGS. 1 and 2. An auto-scaling component 412 can scale the instances 406 based upon rules defined by the customer. In one embodiment, the auto-scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto-scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. The customer account can further include the parameter whether or not to return a result without performing an action. In this way, through the customer account, a customer or administrator can setup the account into an authorization check only mode, wherein each received API does not get performed, but is checked to determine permissions and a result returned accordingly.

A network 430 can be utilized to interconnect the server computers 402A-402D and the server computer 404, 450. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A server 450 can be coupled to the network 430 and perform the authorization check and response. As such, the server 450 can be in conformance with any of the embodiments, such as is shown in FIGS. 1 and 2. In response to receiving an API, the server 450 can retrieve state information associated with resources running in the compute service environment 400 and retrieve the policy information located in the policy document. Depending on the particular configuration, the server 450 can obtain the policy document from the management component 410 and can retrieve additional information from the customer account 415, if needed, to decide how to respond to the API. Using the state information and the policy information, the server can determine whether the requestor is authorized to perform an action associated with the received API. Then based on the parameter indicating whether the API call is an authorization check, the server can respond to the API, but without performing the action.

Figure 5:
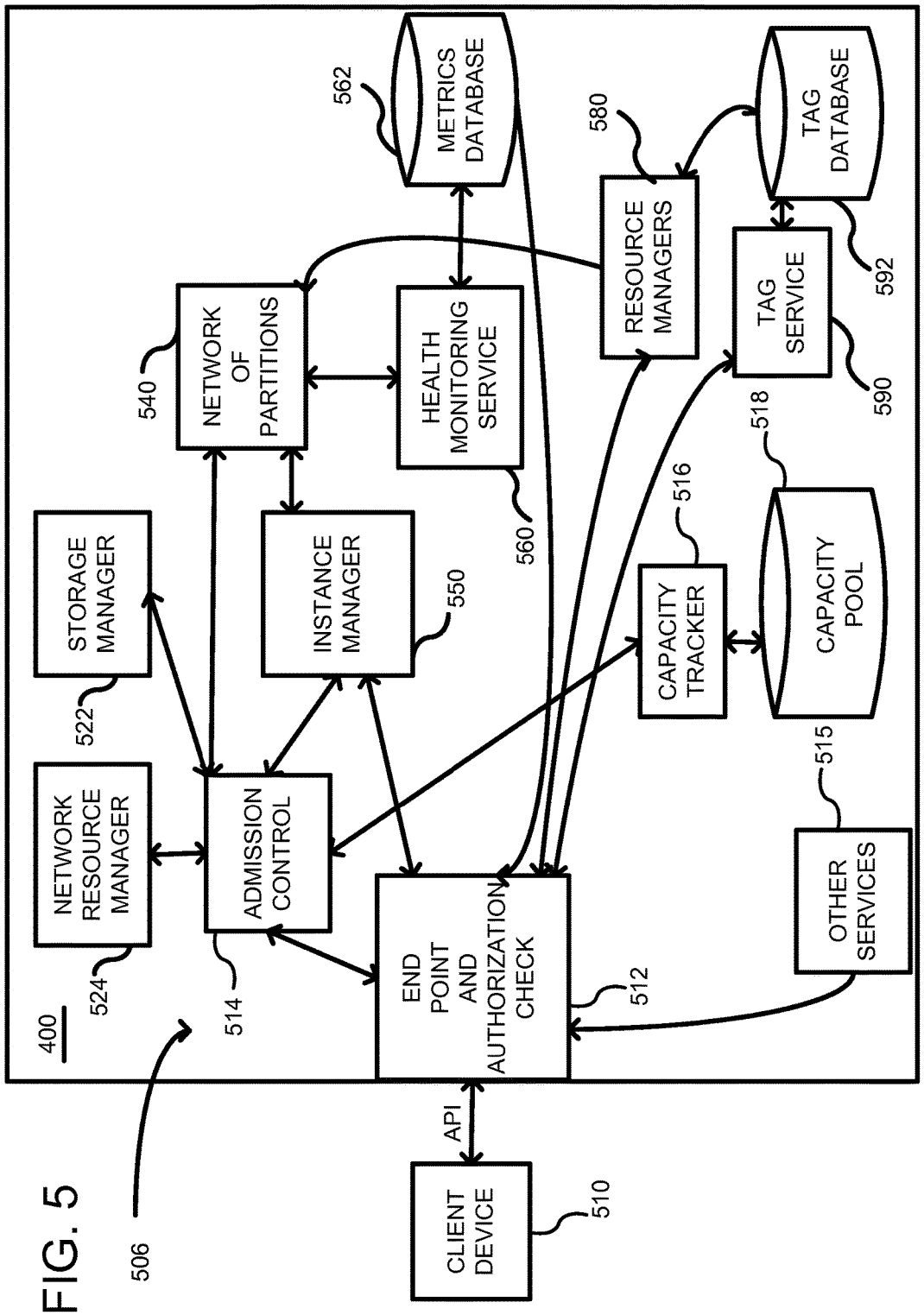
FIG. 5 shows further details of an example system including a plurality of management components associated with a control plane.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process web service requests, such as API calls (also called API requests). In particular, the end point 512 can be a web server configured to expose an API. In this embodiment, the endpoint 512 performs an authorization check, similar to the embodiment of FIG. 1. However, it is understood that the authorization check can reside on a different server computer or as part of a different component. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. Additionally, the admission control 514 can include an authorization component that can access a policy document indicating permissions associated with a user or service. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. An instance manager 550 controls launching and termination of instances in the network. When an instruction is received (such as through an API request) to launch an instance, the instance manager pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

A health monitoring service 560 can provide monitoring for resources and the applications customers run on the compute service provider 400. System administrators can use the monitoring service 560 to collect and track metrics, and gain insight to how applications are running. For example, the monitoring service 560 can allow system-wide visibility into application performance and operational health. Metrics generated by the health monitoring service 560 can be stored in the metrics database 562. The health monitoring service 560 can further collect state information associated with instances and other resources, which can be retrieved by the end point 512.

One or more additional resource managers 580 can be coupled to the end point 512. The resource managers 580 can obtain state information about any available resources in the compute service provider 400. For example, the resource managers 580 can be coupled to the network of partitions 540 for obtaining metadata. The resource managers 580 can further be coupled to databases 592 having state information, such as tag information. The tag information can be supplied to the tag database through a tag service 590. The tag service can be further used in any of the embodiments described herein, such as is shown in FIGS. 1 and 2.

Although the end point 512 is shown obtaining state information from managers, such as the instance manager 550 and the resource managers 580, it can further (or alternatively) obtain state information stored in databases (not shown). The databases can be populated, for example, by the different managers.

Figure 6:
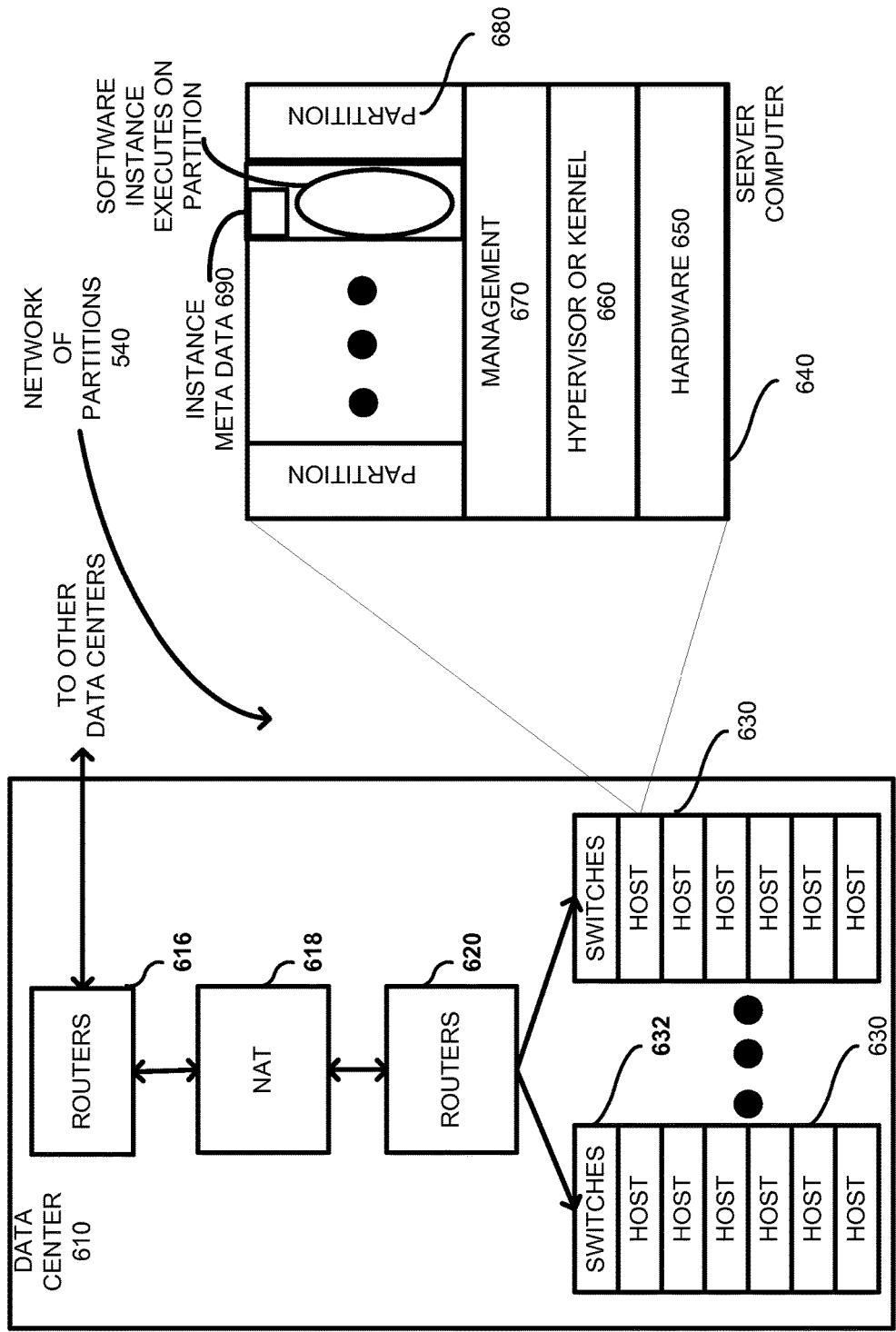
FIG. 6 shows an example of a plurality of host computers, routers and switches, which are hardware assets used for running virtual machine instances.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the health monitoring service 560 for storage in the metrics database 562. Additionally, the management layer 670 can pass to the monitoring service 550 the number of instances that are running, when they were launched, the operating system being used, the applications being run, etc. Additional metrics can be associated with the instance through metadata 690 that can be stored on the partition or otherwise stored on the server computer 640 for access by the management layer 670. All such metrics can be used for consumption by the health monitoring service 560 and stored in database 562. The metrics can then be used to make an authorization determination. The metadata 690 can be sourced from different managers, such as the instance manager 550 and resource managers 580. Such managers can transmit state information directly to the end point without the need to query a host computer 640 for the metadata 690.

Figure 7:
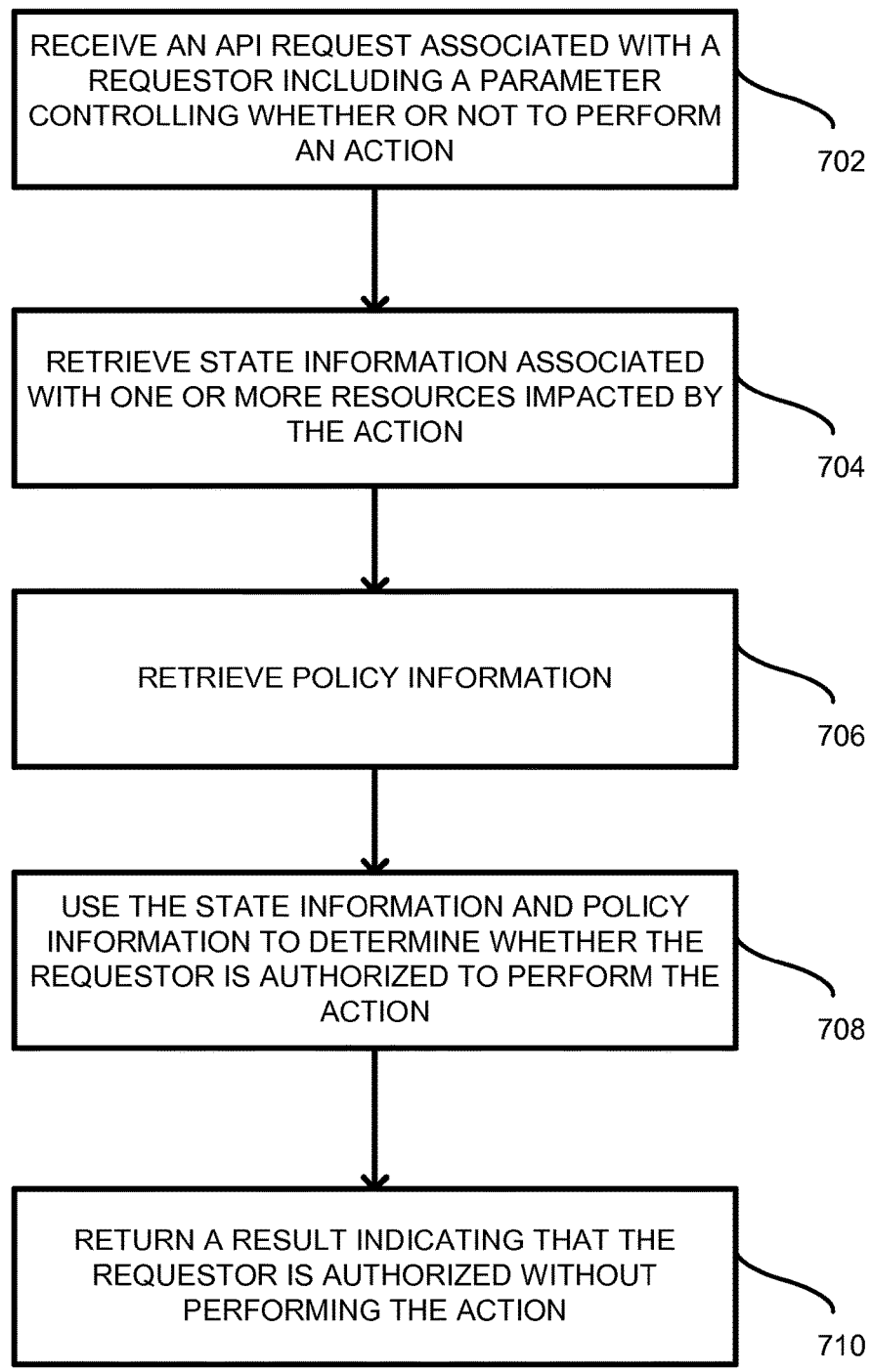
FIG. 7 is a flowchart of a method for performing the authorization check according to one embodiment.

FIG. 7 is a flowchart of a method for performing an authorization check according to one embodiment. In process block 702, an API request can be received associated with a requestor. The API request can include a parameter that controls whether or not to perform an action associated with the API request. Thus, the parameter controls whether the API request is an authorization check or an actual request to perform an action. The difference being that an authorization check only wants to know whether the API would be authorized, but without performing the action. In process block 704, state information can be retrieved associated with one or more resources impacted by the action. Thus, a determination is made regarding which resources the API will impact. For example, an API request to terminate an instance includes an address associated with the instance. In response, a service performing an authorization check can request state information from a management component 670 (FIG. 6) on the host 640 upon which the instance is currently executing. Meta data 690 associated with the instance can then be passed back to the service performing the authorization check. In process block 706, policy information can be retrieved associated with the requestor. The policy information can be obtained by an authorization component, such as component 160 (FIG. 1), which can obtain a policy document 170 using credentials obtained from the API request. The policy information can include permissions associated with the requestor or actions that are allowed to be performed on the resources.

In process block 708, the state information and policy information can be used to determine whether the requestor is authorized to perform the action. The determination can be made by an analysis of a permission statement having the state information used as variables to see whether the permission statement is satisfied. If the permission statement is satisfied, then a determination can be made whether or not that indicates authorization. If the action is authorized, then in process block 710, a result is returned indicating that the requestor is authorized, but the action is not performed. The requestor can receive the result and use the result for a variety of purposes. For example, the result can be used to display user options based on the authorization. Additionally, such results can be used as periodic audits wherein an administrator assumes the role of the requestor to audit policy information.

Figure 8:
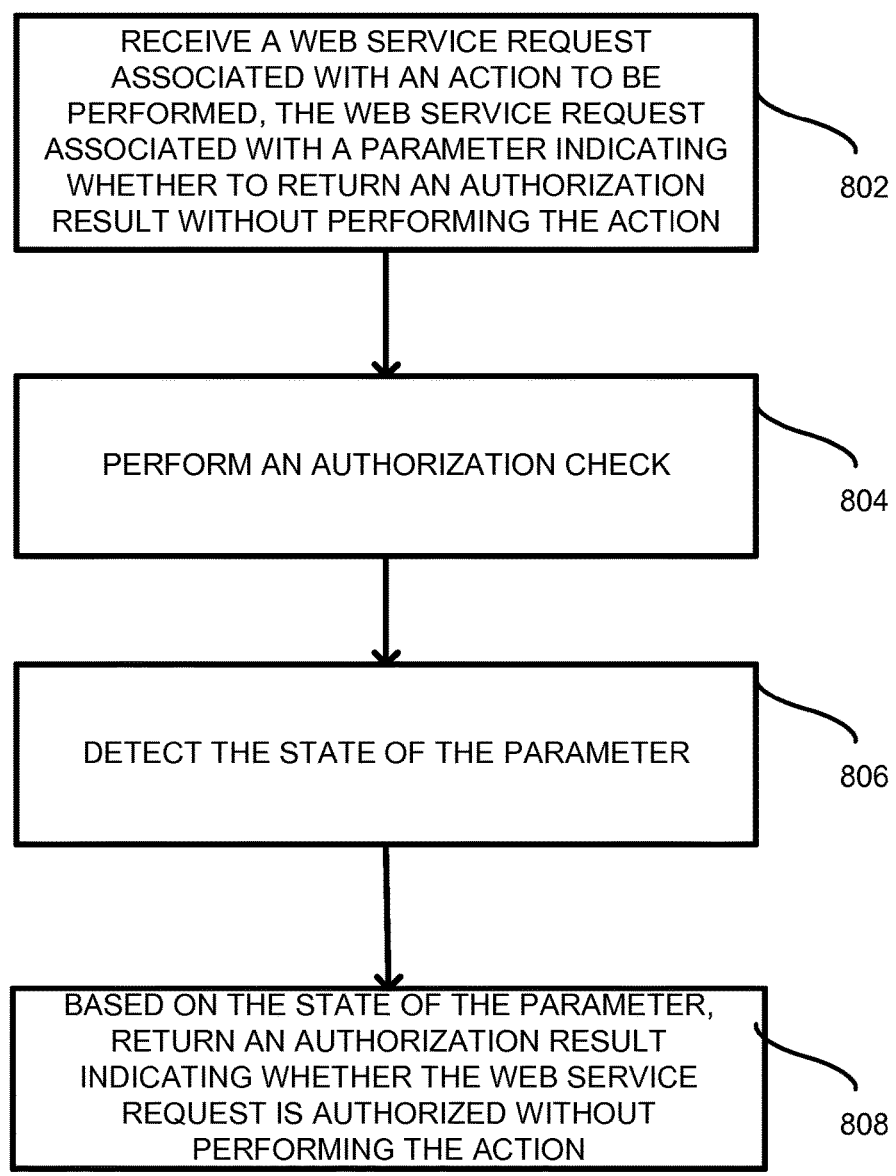
FIG. 8 is a flowchart of a method for performing the authorization check according to another embodiment.

FIG. 8 is a flowchart of method according to another embodiment. In process block 802, a web service request is received (e.g., an API request) that is associated with an action to be performed. The web service request can be associated with a parameter indicating whether to return an authorization result without performing the action. The parameter can be included in the web request itself. Alternatively, the parameter can be separate from the request, such as being in a customer account. In process block 804, an authorization check can be performed to determine whether the web service request satisfies permissions stored within a policy document. In process block 806, a state of the parameter can be detected. For example, the parameter can be extracted from the request or obtained from another source, such as a customer account. If the authorization result indicates that the web service request is authorized and the parameter state indicates that an authorization check is enabled, then the result can be returned indicating the authorization result, but without performing the action (process block 808).

Figure 9:
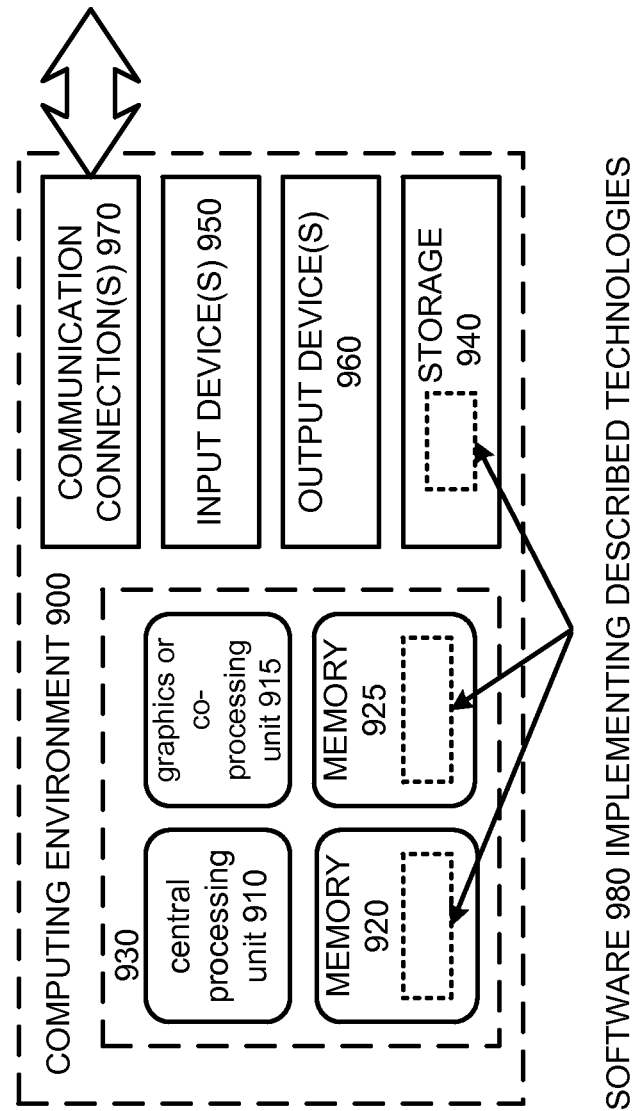
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of performing an authorization check of an API request, the method comprising:
   receiving the API request associated with a requestor, the API request including a parameter controlling whether or not to perform an action associated with the API request;
   retrieving state information associated with one or more resources that are impacted by the action should it be performed, wherein the one or more resources include an instance running on a host server computer and wherein the state information includes one of the following: a type of the instance, a region in which the instance is executing, or a security group associated with the instance;
   retrieving policy information;
   comparing the state information to the policy information to determine whether the requestor is authorized to perform the action associated with the API request; and
   if the parameter indicates that the action should not be performed, then returning a result indicating whether the requestor is authorized to perform the action, but without performing the action.

2. The method of claim 1, wherein the policy information includes permissions associated with the requestor or actions allowed to be performed on the resources.

3. The method of claim 1, wherein the parameter is a Boolean operator having set and unset states.

4. The method of claim 1, wherein the API request identifies an administrator and the requestor, and the administrator transmits the API request either periodically or non-periodically to check on the permissions of the requestor for auditing or debug purposes.

5. The method of claim 1, wherein the API request is a request to modify at least one resource, and the result indicates whether the requestor has permissions to perform the action so as to modify the at least one resource.

6. The method of claim 1, wherein the API request is received from an application and wherein the application displays user options based on the authorization.

7. A computer-readable storage media having instructions thereon for performing an authorization check of a web service request, the method comprising:
   receiving the web service request associated with an action to be performed in a multi-tenant environment, the web service request associated with a parameter indicating whether to return an authorization result without performing the action;
   performing an authorization check, the authorization check including retrieving state information for instances executing within the multi-tenant environment and retrieving policy information associated with permissions and comparing the state information to the permissions, wherein the state information includes one or more regions in which the instances are executing, security groups associated with the instances, or costs associated with the instances;
   detecting a state of the parameter; and
   based on the state of the parameter, returning an authorization result indicating whether the web service request is authorized without performing the action.

8. The computer-readable storage media of claim 7, wherein performing an authorization check includes retrieving instance metadata from instances that would be impacted by the web service request should the action be completed.

9. The computer-readable storage media of claim 7, wherein the web service request is generated by an administrator that is checking a requestor's permissions.

10. The computer-readable storage media of claim 7, further including performing an authentication of a requestor associated with the web service request.

11. The computer-readable storage media of claim 7, wherein the action is to modify one or more instances executing on one or more host server computers in the multi-tenant environment.

12. The computer-readable storage media of claim 7, wherein the policy information includes the permissions associated with a requestor or actions allowed to be performed on resources in the multi-tenant environment.

13. The computer-readable storage media of claim 7, wherein the multi-tenant environment is dynamically changing state.

14. The computer-readable storage media of claim 7, wherein the authorization result further includes an authorization failure or the authorization confirmation without performing the action.

15. The computer-readable storage media of claim 7, wherein the parameter is a Boolean operator having set and unset states and the parameter is included in the web service request or within a customer account.

16. The computer-readable storage media of claim 7, wherein the web service request is received from an application that includes credentials of the requestor, and wherein the application displays user options based on the authorization.

17. A system for performing an authorization check, comprising:
   an admission control component for accessing a policy document in response to an API request from a user, the API request being a request to perform an action;
   a first host server computer executing a resource manager to obtain state information associated with resources executing on host server computers that are impacted by the API request, wherein the resources include instances executing on the host server computers and the state information includes security groups associated with the instances; and
   a second host server computer coupled to the first host server computer and executing an authorization check component to determine whether the user is authorized to perform the action based, at least in part, on a comparison between the policy document and the state information, and to return an authorization check response without performing the action.

* * * * *